(12) United States Patent
Mola et al.

(10) Patent No.: US 10,697,465 B2
(45) Date of Patent: Jun. 30, 2020

(54) MANUFACTURING OF A TURBOMACHINE IMPELLER BY ASSEMBLING A PLURALITY OF TUBULAR COMPONENTS

(71) Applicant: Nuovo Pignone Srl, Florence (IT)

(72) Inventors: Paolo Mola, Pontassieve (IT); Gabriele Masi, Florence (IT); Mihirkumar Pravinbhai Patel, Bangalore (IN); Leonardo Tognarelli, Florence (IT); Federico Iozzelli, Monsummano Terme (IT)

(73) Assignee: Nuovo Pignone SRL, Florence (IT)

( * ) Notice: Subject to any disclaimer, the term of this patent is extended or adjusted under 35 U.S.C. 154(b) by 358 days.

(21) Appl. No.: 15/323,134

(22) PCT Filed: Jul. 2, 2015

(86) PCT No.: PCT/EP2015/065114
§ 371 (c)(1),
(2) Date: Dec. 30, 2016

(87) PCT Pub. No.: WO2016/001368
PCT Pub. Date: Jan. 7, 2016

(65) Prior Publication Data
US 2017/0260997 A1    Sep. 14, 2017

(30) Foreign Application Priority Data
Jul. 4, 2014   (IT) ................. FI2014A0160

(51) Int. Cl.
*F04D 1/04*   (2006.01)
*F04D 29/28*  (2006.01)
(Continued)

(52) U.S. Cl.
CPC .......... *F04D 29/284* (2013.01); *B22F 3/1055* (2013.01); *B22F 5/009* (2013.01);
(Continued)

(58) Field of Classification Search
CPC .......... B22F 3/1055; B22F 5/009; B22F 5/04; B22F 3/15; B22F 7/062; B22F 7/0064;
(Continued)

(56) References Cited

U.S. PATENT DOCUMENTS 3,940,268 A    2/1976  Catlin
2003/0235502 A1*  12/2003  Van Dine ............... F04D 29/023
                                                                416/230

(Continued)

FOREIGN PATENT DOCUMENTS

CN    102251984 A    11/2011
CN    102713305 A    10/2012
(Continued)

OTHER PUBLICATIONS

Machine Translation First Office Action and Search issued in connection with corresponding CN Application No. 201580036602.5 dated Jul. 3, 2018.
(Continued)

*Primary Examiner* — Jun S Yoo
(74) *Attorney, Agent, or Firm* — Baker Hughes Patent Organization

(57) ABSTRACT

A method for manufacturing impellers is described. The method provides for manufacturing a plurality of tubular components, each tubular component forming an inner passage, which is shaped as one of the flow passages of the final impeller. The tubular components are assembled together forming a semi-finished impeller. The semi-finished impeller is provided with annular cavities extending around the rotation axis of the impeller and gaps between adjacent tubular components. The gaps and cavities are filled with metal powder and the semi-finished impeller is subject to hot isostatic pressing, to densify the metal powder and form a monolithic final impeller.

21 Claims, 10 Drawing Sheets

(51) Int. Cl.
*B22F 5/00* (2006.01)
*B22F 5/04* (2006.01)
*B22F 3/105* (2006.01)
*F04D 29/02* (2006.01)
*F04D 29/22* (2006.01)
*F04D 29/30* (2006.01)
*F01D 5/04* (2006.01)
*B22F 7/06* (2006.01)
*B22F 3/15* (2006.01)
*B23P 15/00* (2006.01)

(52) U.S. Cl.
CPC .................. *B22F 5/04* (2013.01); *F01D 5/04* (2013.01); *F04D 29/023* (2013.01); *F04D 29/026* (2013.01); *F04D 29/22* (2013.01); *F04D 29/2222* (2013.01); *F04D 29/30* (2013.01); *B22F 3/15* (2013.01); *B22F 7/062* (2013.01); *B23P 15/006* (2013.01); *F05D 2230/20* (2013.01); *F05D 2230/22* (2013.01); *F05D 2230/31* (2013.01); *F05D 2230/42* (2013.01); *F05D 2230/50* (2013.01); *F05D 2230/60* (2013.01); *F05D 2300/10* (2013.01); *Y02P 10/295* (2015.11)

(58) Field of Classification Search
CPC ...... F04D 29/284; F04D 29/22; F04D 29/023; F04D 29/026; F04D 29/2222; F04D 29/30; F04D 17/08; F04D 29/42; F04D 29/62; F01D 5/043; F01D 5/12; F01D 5/04; F05D 2230/20; F05D 2230/50; F05D 2230/60; F05D 2300/10; F05D 2230/22; F05D 2230/31; F05D 2230/23; F05D 2230/42; B23P 15/006; Y02P 10/295

See application file for complete search history.

(56) References Cited

U.S. PATENT DOCUMENTS

| | | | |
|---|---|---|---|
| 2009/0110556 | A1 | 4/2009 | Jahnz et al. |
| 2011/0286855 | A1* | 11/2011 | Cappuccini ............... B22F 3/15 416/241 R |
| 2013/0336776 | A1 | 12/2013 | Siddle et al. |

FOREIGN PATENT DOCUMENTS

| | | |
|---|---|---|
| CN | 103511332 A | 1/2014 |
| EP | 2 388 091 A1 | 11/2011 |
| EP | 2388091 A1 | 11/2011 |
| GB | 2002817 A | 2/1979 |
| SU | 274300 A1 | 6/1970 |
| WO | 2011063333 A1 | 5/2011 |
| WO | 2012/131617 A1 | 10/2012 |
| WO | 2012131617 A1 | 10/2012 |
| WO | 2013/124314 A1 | 8/2013 |
| WO | 2013124314 A1 | 8/2013 |

OTHER PUBLICATIONS

Office Action and Search issued in connection with corresponding RU Application No. 2016150916 dated Dec. 4, 2018.

Unofficial English translation of Italian Search Report and Written Opinion issued in connection with corresponding IT Application No. ITFI20140160 dated Mar. 4, 2015.

International Search Report and Written Opinion issued in connection with corresponding Application No. PCT/EP2015/065114 dated Sep. 30, 2015.

\* cited by examiner

STATE OF THE ART

STATE OF THE ART

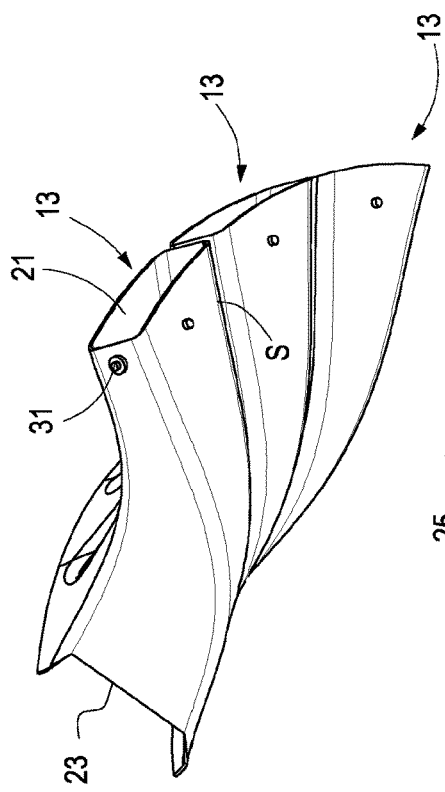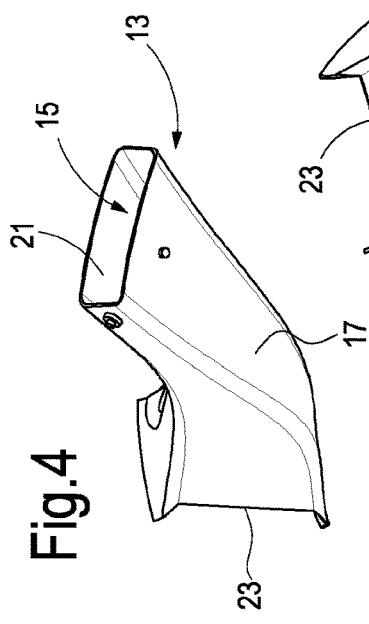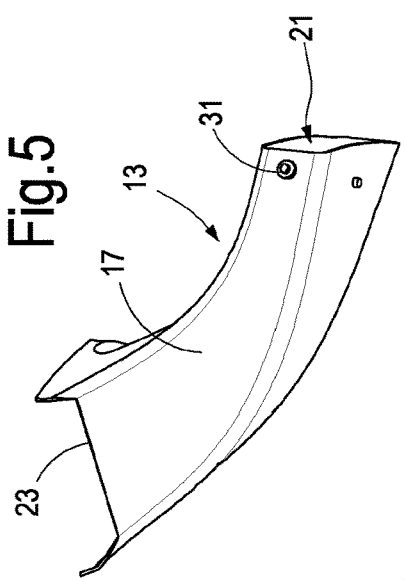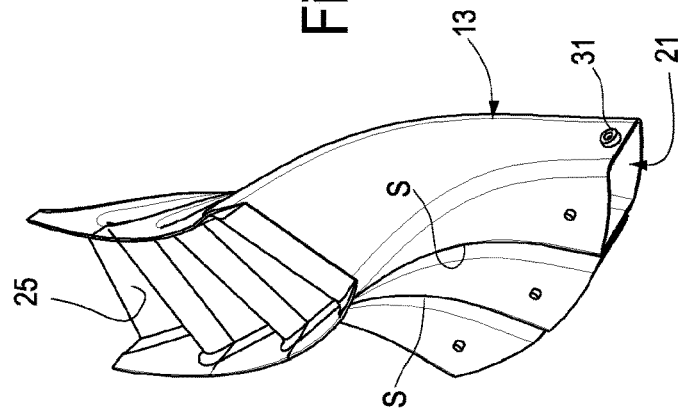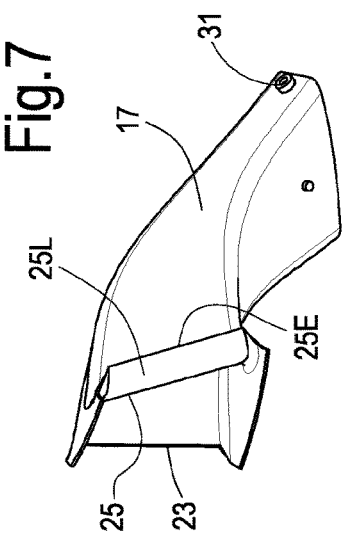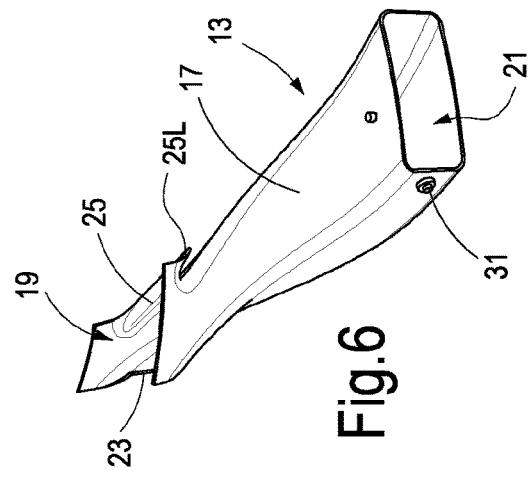

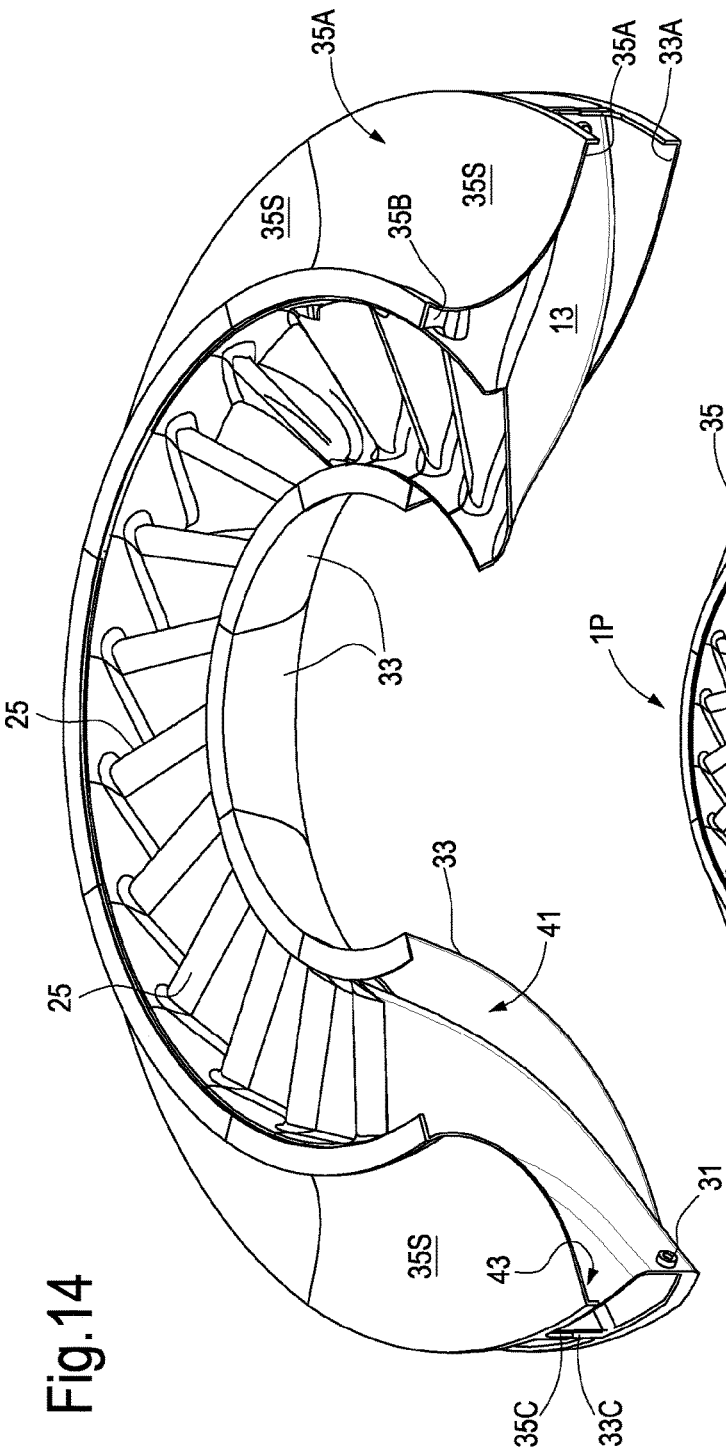
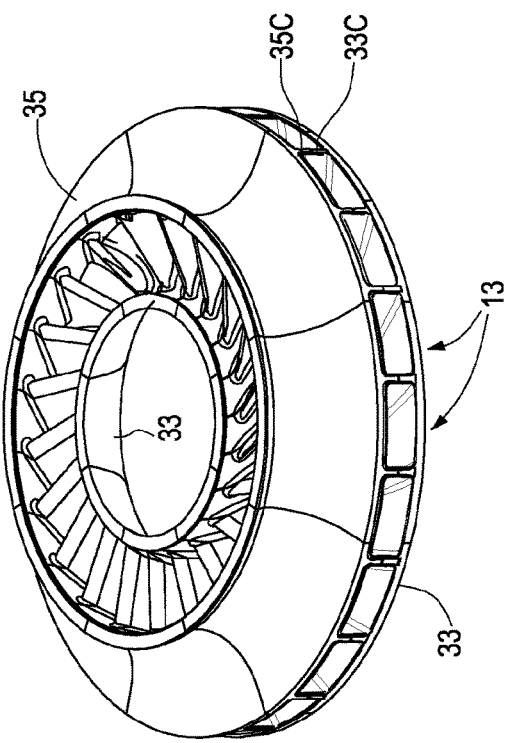
Fig.14
Fig.15

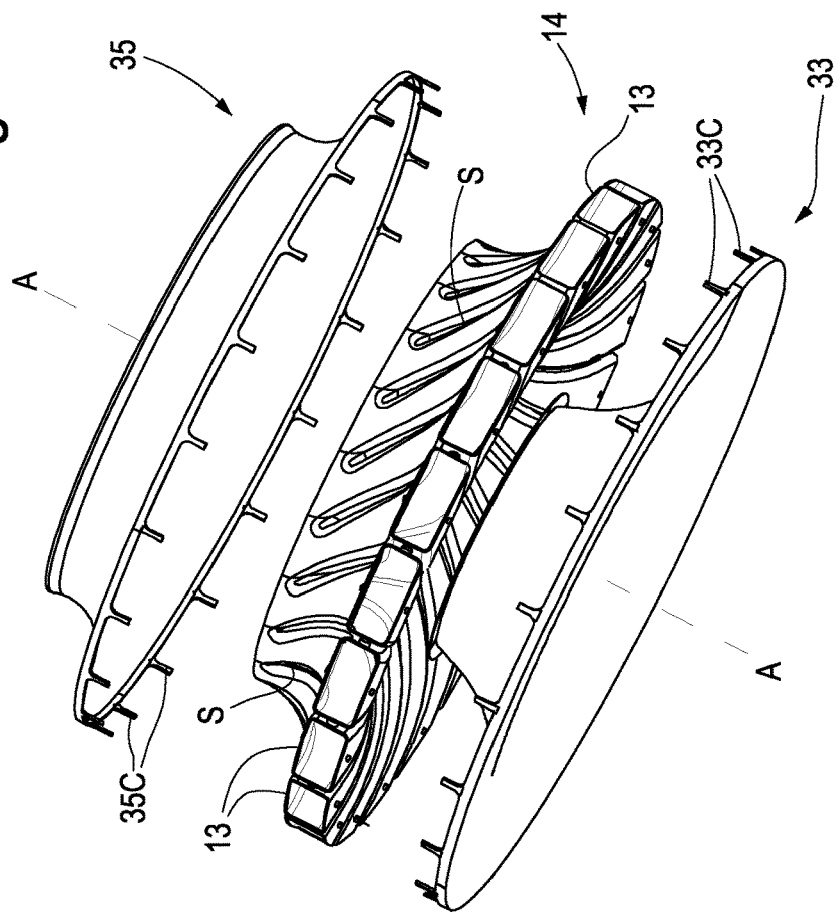
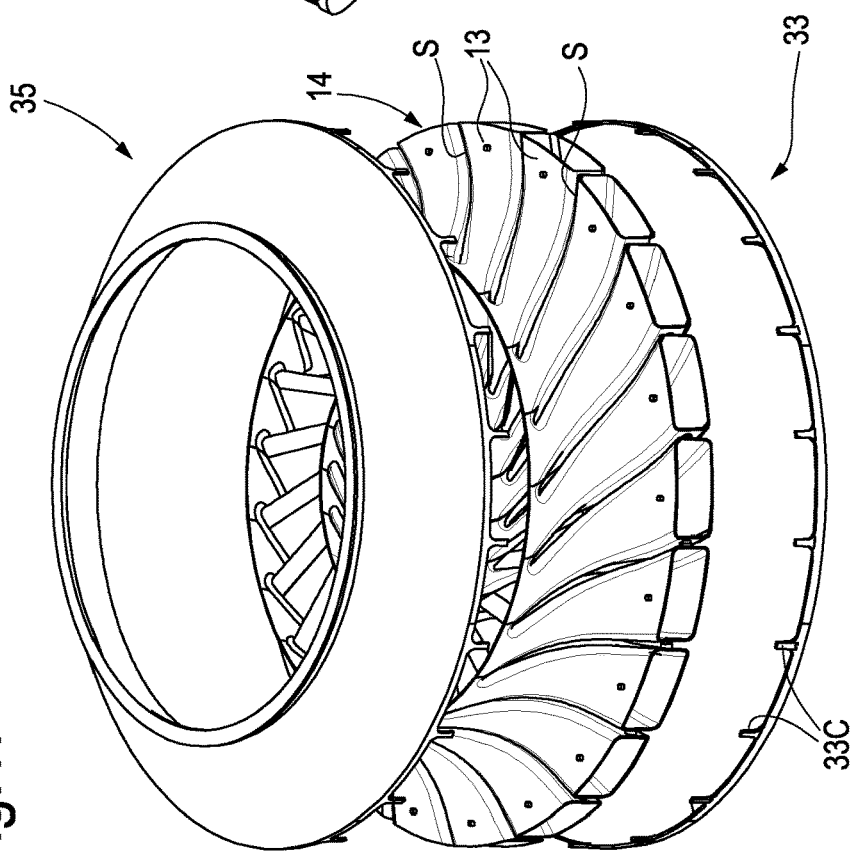

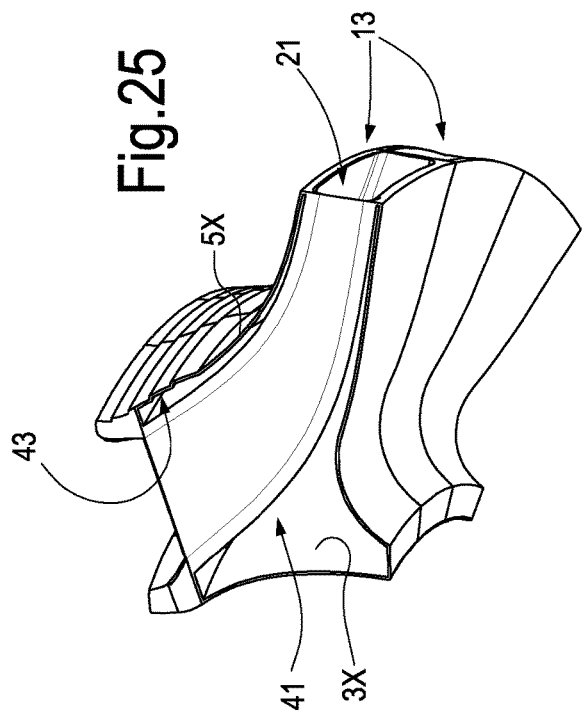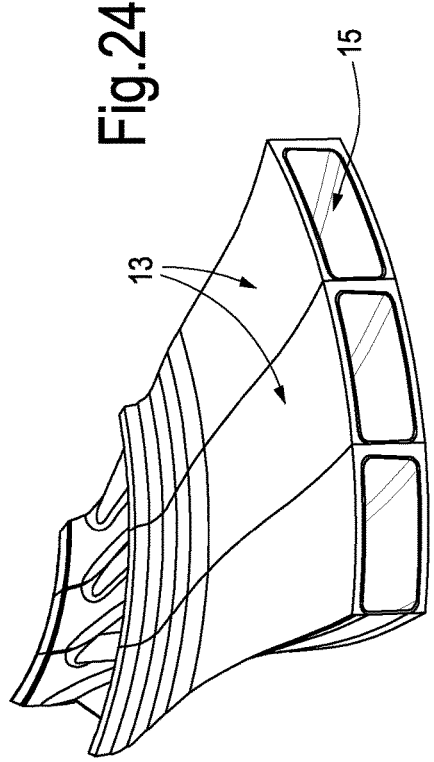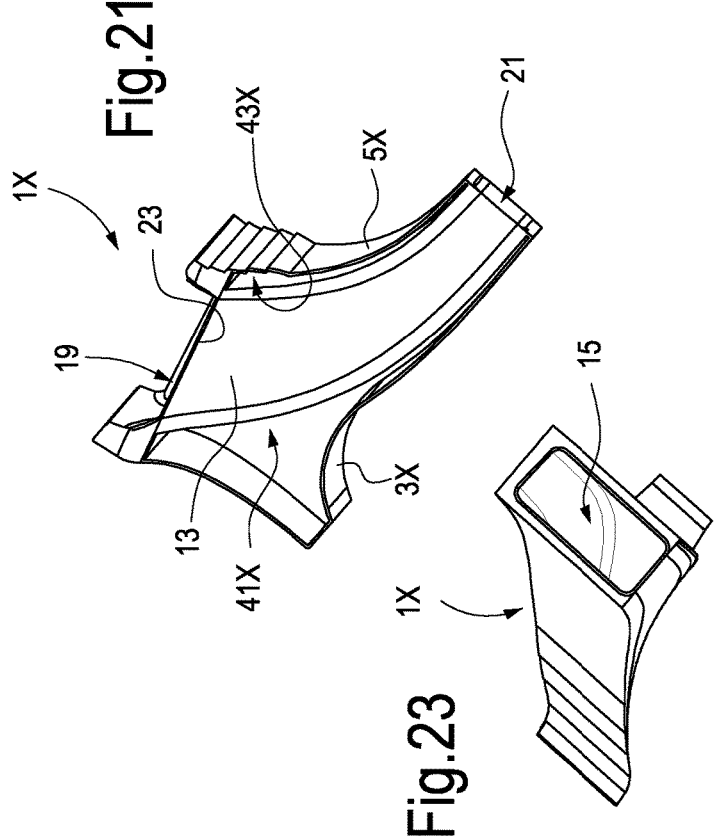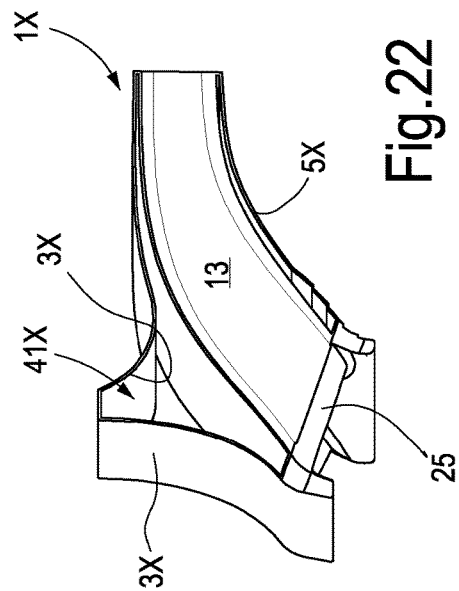

MANUFACTURING OF A TURBOMACHINE IMPELLER BY ASSEMBLING A PLURALITY OF TUBULAR COMPONENTS

BACKGROUND

Embodiments of the invention relate to turbomachine manufacturing. More specifically, the subject matter disclosed herein relates to methods for manufacturing turbomachine impellers, e.g. impellers for centrifugal or centripetal turbomachines, such as centrifugal pumps and compressors and centripetal turbines.

Turbomachines comprise one or more rotating components and one or more stationary components. In turbocompressors, a fluid flowing through the turbomachine is accelerated by the rotary motion of the rotating components and is slowed down in stationary components, where kinetic energy of the fluid is converted into pressure energy. In turbines or expanders, the energy contained in the fluid flowing through the turbomachine is converted into mechanical power available on the turbine shaft or on the expander shaft.

Centrifugal turbomachines, such as centrifugal pumps and compressors, are usually comprised of one or more impellers mounted for rotation in a casing. The impellers can be mounted on a rotary shaft which is supported in the casing by suitable bearings and rotates therein together with the impellers. Each impeller is comprised of a disc having a front surface and a back surface and provided with a central hole for the rotary shaft. In some known embodiments the impellers are provided with frontal teeth torsionally engaging mutually adjacent impellers to one another. A central rod axially locks the impellers together.

Blades extend from the front surface of the disc and define fluid passages therebetween, also called impeller vanes. The impeller can further comprise a shroud, which is connected to the blades and closes the fluid passages or vanes on the side opposite the disc.

The vanes or fluid passages formed between adjacent blades have usually a complex shape, which is dictated by fluid-dynamic considerations. Each impeller is combined with a diffuser, which receives fluid accelerated from the impeller and wherein kinetic energy of the fluid is converted into pressure energy, thus boosting the fluid pressure. The diffuser is usually formed in a so called stationary diaphragm housed in the machine casing.

Turbomachine components, which interact with the fluid flow, have often a rather complex shape. This applies both to the stationary components, as well as to the rotating components, such as the impellers.

Manufacturing of complex turbomachine components, such as diffusers and impellers, is sometimes performed by numerically controlled chip removal machining. However, machining by chip removal is limited to some shapes of diffuser and impeller, since not every fluid-dynamic surface can be machined by a chip removal tool. According to other known methods, impellers are manufactured by welding single components to one another. According to yet further known methods, investment casting is used for impeller manufacturing.

Another option for the manufacturing of turbomachine impellers is by so-called electric discharge machining (EDM), a technique wherein a workpiece in the shape of a disc is placed in a dielectric liquid and co-acts with an electrode. A voltage difference between the workpiece and the electrode is applied, thus generating electric sparks, which erode the surface of the workpiece. The electrode is shaped so that the required cavity is obtained by erosion. Different tools with different electrodes are used in sequence to machine the workpiece until the final impeller shape is obtained.

Also EDM has limitations and drawbacks, in particular due to the need of using several electrodes of different shapes in order to achieve the required final shape of the impeller. The electrodes are subject to wear and must often be replaced. Electric discharge machining is, moreover, a rather slow process.

According to a further known technique, turbomachine impellers can be manufactured by powder metallurgy using a hot isostatic pressing process. FIGS. 1 and 2 schematically illustrate an exemplary embodiment of this known powder metallurgy process for impeller manufacturing. FIG. 1 illustrates a schematic partial cross section view of a compressor impeller manufactured by powder metallurgy process and FIG. 2 illustrates an axonometric view of a core used for manufacturing the impeller schematically shown in FIG. 1.

Referring to FIG. 1, an impeller 100 comprises a disc 103 and a shroud 105. Between disc 103 and shroud 105 impeller blades 107 are arranged. Flow passages or vanes 109 are formed between consecutive adjacent impeller blades 107. Each flow passage 109 is bounded by impeller disc 103 and impeller shroud 105. The impeller disc 103 also forms a hub portion 103H with a hole 111, where through a shaft (not shown) passes, whereon the impeller 100 is mounted for rotation in the turbomachine casing (not shown). In FIG. 1 the solid portions of impeller 100 are hatched in different ways to show portions of the impeller which are manufactured with different materials and in different steps of a manufacturing process. The outer portions of both the impeller disc 103 and the impeller shroud 105 are manufactured separately and assembled with a core 113 arranged therebetween. The core 113 is made of a metal which can be dissolved by a suitable acid after the impeller has been manufactured. The core 113 reproduces the shape of the flow passages or vanes 109. More specifically, the core 113 has a plurality of radially extending core portions 113P, each corresponding to the empty volume of a respective flow passage or vane 109. The core portions 113P are separated by slots 115, the shape whereof corresponds to the shape of the impeller blades 107.

The impeller 100 is manufactured by placing the core 113 between two disc-shaped components, which form the outer skin of the impeller disc 103 and the outer skin of the impeller shroud 105. The cross-sectional shape of the core 113, as well as the cross-sectional shape of the outer skin portions of the impeller disc 103 and of the impeller shroud 105 are such that an empty volume is formed between the core portions 113P and both skin portions of the impeller disc 103 and the impeller shroud 105. The empty volume is then filled with a metal powder and the cavities are sealed. The unit thus obtained is subject to hot isostatic pressing, sometimes also called "HIP" or "hipping", whereby heat and pressure are applied to the outer surfaces of the semi-finished article formed by the core, surrounding powder filling the inner cavities and the outer skin portions of the impeller disc 103 and impeller shroud 105. The metal powder is densified and solidified, thus forming the inner solid portions of the impeller 100. In order to form the flow passages or vanes 109, the core 113 must be removed. This is performed by acid etching.

The above described method has several drawbacks. The core 113 is an expensive and complex component, which must be machined from a solid workpiece. Manufacturing of the core 113 is an expensive process. The resulting core 113 is used only once for manufacturing a single impeller 100 and is subsequently destroyed.

Moreover, the above summarized technology sets heavy limitations on the choice of the materials that can be used for manufacturing the impeller. More specifically, both the metal forming the skin portions as well as the metal powder must resist the action of the acid used for removing the core. In turn, the core 113 must be manufactured with a metal which is capable of withstanding the high pressure and temperature conditions during hipping, but which is at the same time suitable for removal by acid etching.

There is therefore a need for an improved method of manufacturing complex turbomachine components such as in particular, but not limited to, centrifugal impellers for pumps and compressors.

BRIEF DESCRIPTION

According to some embodiments of the subject matter disclosed herein, a method for producing a turbomachine impeller is provided, wherein tubular components are separately manufactured and then assembled to one another. Each tubular component has an inner surface and an outer surface. The inner surface of the tubular component defines the inner surface of a respective one of the flow passages of the impeller, i.e. an impeller vane. A plurality of tubular components are assembled around an impeller axis, leaving a gap or empty space between adjacent tubular components. The empty space or gap is then filled with powder material, e.g. metal powder. The powder material is subsequently densified and solidified by hot isostatic pressing, thus forming the cores of the blades, the skins of each blade being formed by wall portions of pairs of adjacent tubular components.

The need of a manufacturing a core and removal thereof by acid etching is thus avoided. Manufacturing of the impeller is made simpler, faster and less expensive. Additionally, a wider choice of materials is available, since using acid-resistant materials is not required.

According to some embodiments, a method is provided, including the following steps: manufacturing a plurality of tubular components, each having an inlet and an outlet; assembling the tubular components to one another forming a plurality of circularly arranged tubular components around an axis, leaving empty spaces or gaps between adjacent tubular components; filling the empty spaces or gaps with a powder material; and densifying the powder material in the empty spaces or gaps by hot isostatic pressing.

Any suitable technique can be used for manufacturing the tubular components. Some options will be described later on.

The disc and shroud of the impeller can be formed in various ways.

In some embodiments, methods disclosed herein further comprise the steps of forming a shroud skin and a disc skin, the circularly arranged tubular components being located between the disc skin and the shroud skin and connected thereto. The method can further include the steps of leaving a first empty cavity between the shroud skin and the tubular components and filling the first empty cavity with a powder material. The powder material filling the first empty cavity is densified by hot isostatic pressing.

According to some embodiments, methods are provided, further comprising the steps of: leaving a second empty cavity between a disc skin and the tubular components; filling the second empty cavity with a powder material; densifying the powder material in the second empty cavity by hot isostatic pressing.

According to further embodiments, methods are disclosed, wherein the step of manufacturing each tubular component comprises the step of simultaneously forming at least one of a shroud segment and a disc segment as a single piece with the respective tubular component. In some exemplary embodiments, methods are further provided, comprising the step of forming at least one of an impeller shroud and an impeller disc by assembling the tubular components to one another.

Some embodiments disclosed herein include the steps of manufacturing, e.g. by additive manufacturing, impeller segments, which are subsequently assembled leaving empty spaces or gaps and cavities therein. Each impeller segment comprises at least one tubular component forming a respective flow passage or vane of the impeller. Each impeller segment further comprises a shroud segment and a disc segment. The disc segment can include a hub segment. A cavity can be provided in the shroud segment and/or in the disc segment.

In the embodiments, the disc segment of each impeller segment comprises a cavity surrounded by a skin located in the hub segment. The impeller segments are bonded together, e.g. by welding, brazing or soldering. An annular cavity can thus be formed in the shroud area and a further annular cavity can be formed in the hub or disc area. Each annular cavity is formed by the single cavities of adjoining impeller segments. Furthermore, spaces or gaps are left between adjacent tubular components of adjacent impeller segments. The gaps and cavities can be filled with powder material, which is subsequently densified and solidified by hot isostatic pressing. A final solid impeller is thus obtained.

According to a further aspect, the subject matter disclosed herein relates to a turbomachine impeller, comprising: a disc; a shroud; a plurality of blades between the disc and the shroud; and flow passages or vanes between adjacent blades. Each blade comprises an inner core of densified powder material connecting skin portions of the blade, the skin portions forming a suction side and a pressure side of the respective blade.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 4, 5, 6, and 7 illustrate various axonometric views of a tubular component used for manufacturing a turbomachine impeller according to a first embodiment of the methods disclosed herein;

FIGS. 8 and 9 illustrate a plurality of tubular components of FIGS. 4 through 7 in a partly assembled condition;

FIGS. 12, 13 and 14 illustrate axonometric views of a portion of the assembled disc skin, shroud skin and tubular components arranged therebetween;

FIG. 15 illustrates an axonometric view of the final impeller;

FIGS. 16 and 17 illustrate exploded views similar to FIGS. 10 and 11 in a further embodiment of the methods disclosed herein;

FIGS. 21, 22 and 23 illustrate axonometric views of a tubular component according to the method of FIG. 20;

FIGS. 24 and 25 illustrate a group of tubular components according to FIGS. 21 to 23 in an assembled condition.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following disclosure specifically relates to the manufacturing of centrifugal turbomachine impellers. Some features and advantages of the methods disclosed herein can also be exploited for manufacturing of centripetal impellers of turbomachines, such as turbo-expanders and turbines.

Figure 2:
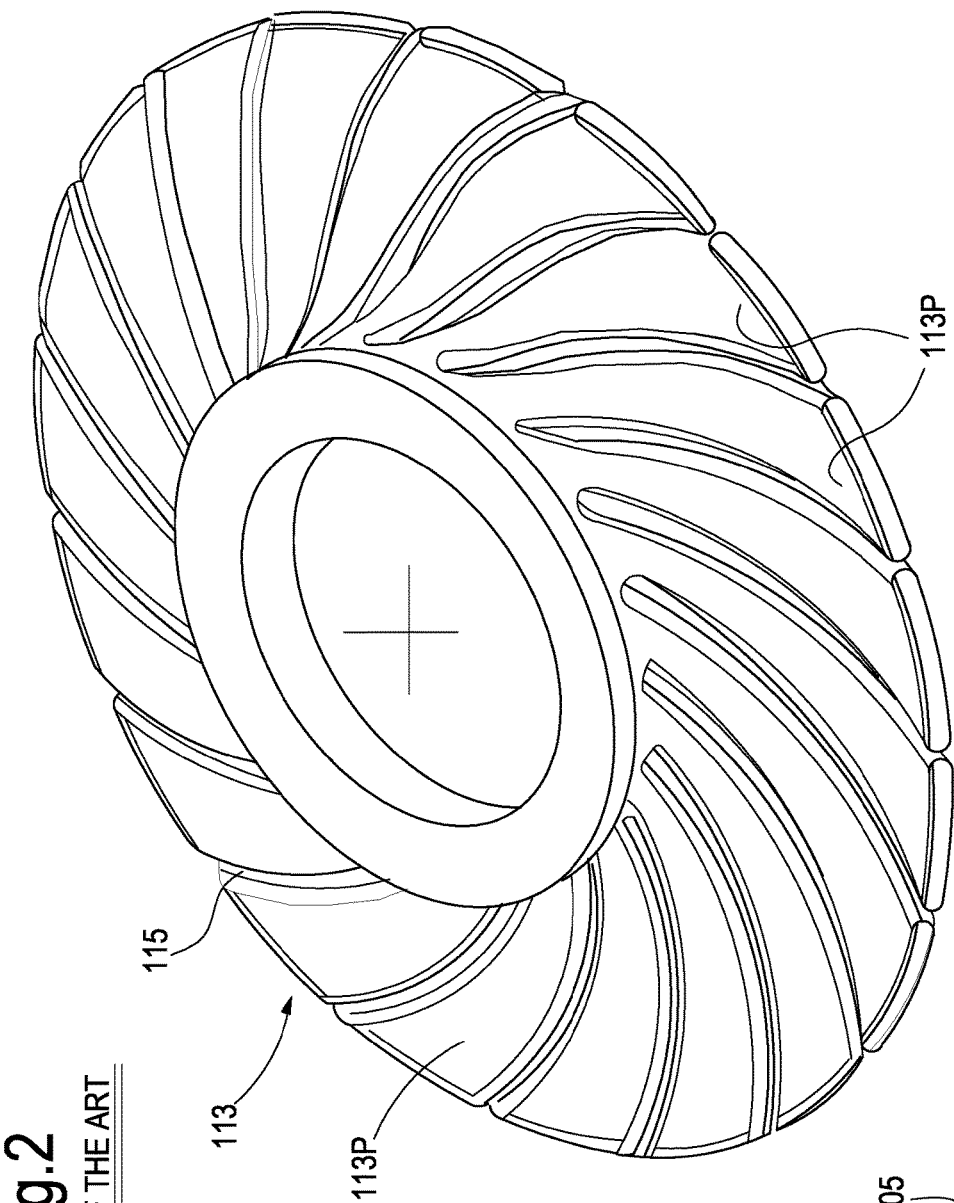
FIG. 2 illustrates a core for compressor impeller manufacturing according to the current art.
Figure 1:
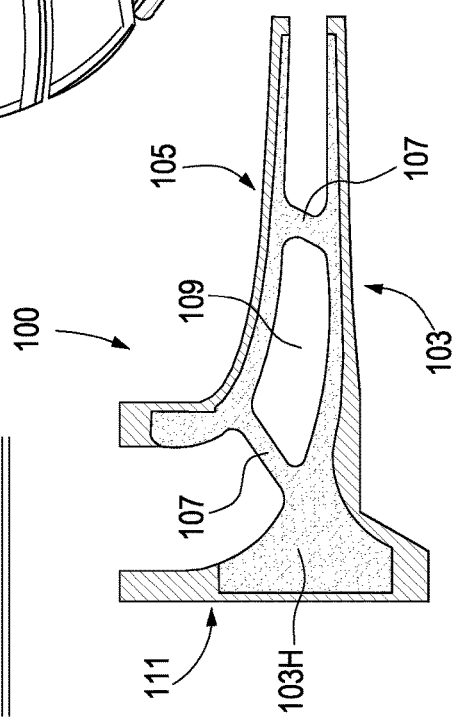
FIG. 1 illustrates a cross-sectional view of a compressor impeller.
Figure 3:
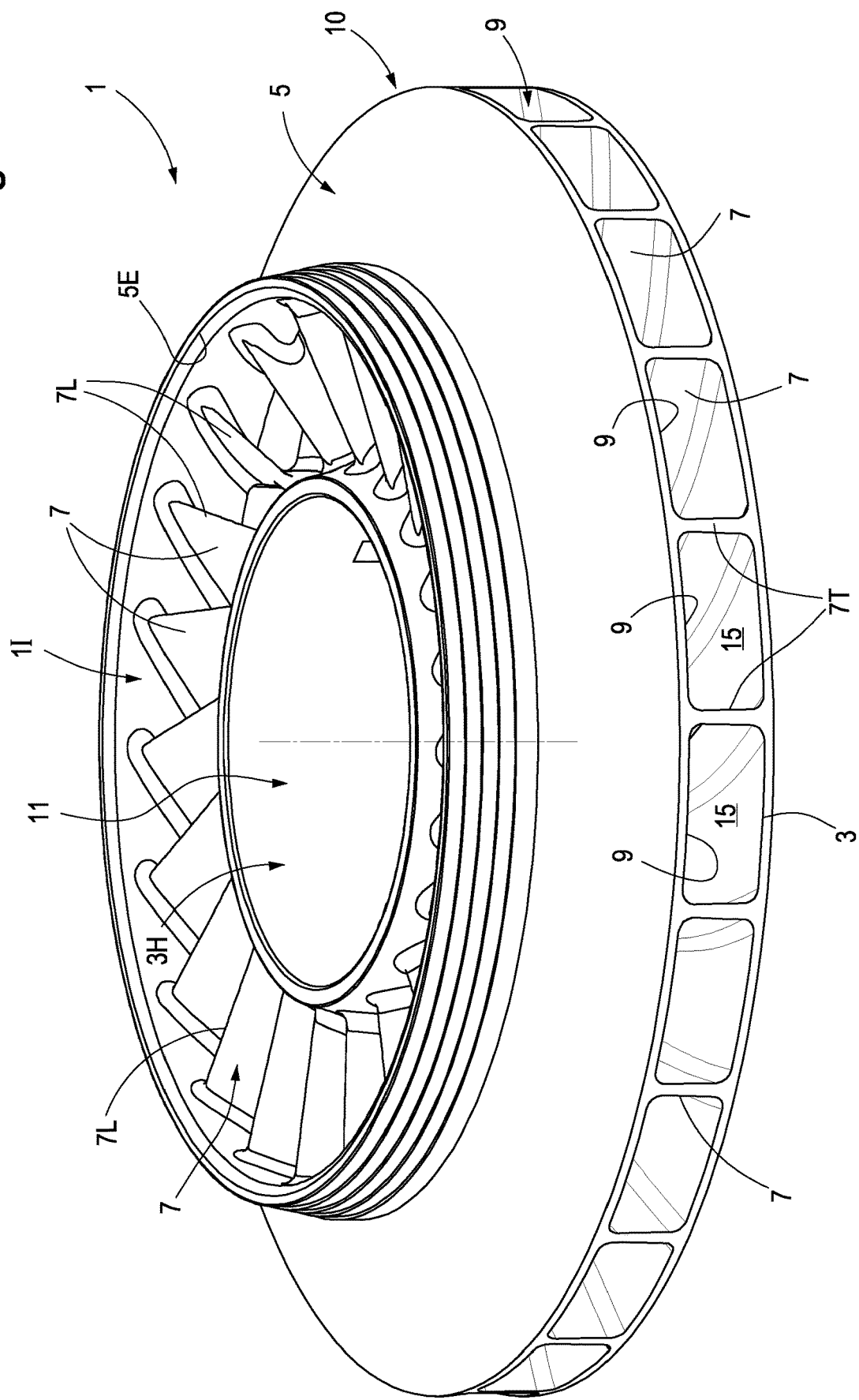
FIG. 3 illustrates an axonometric view of an impeller, which can be manufactured with the methods disclosed herein.

FIG. 3 illustrates an axonometric view of a centrifugal impeller 1 for a turbomachine, for example a centrifugal compressor. According to some embodiments, the impeller 1 comprises a disc 3, a shroud 5 and a plurality of blades 7 arranged between the disc 3 and the shroud 5 and connecting impeller disc 3 and impeller shroud 5 to one another. Flow passages or vanes 9 are formed between pairs of consecutive blades 7. Each blade 7 is comprised of a leading edge 7L and a trailing edge 7T, arranged at an impeller inlet 1I and at an impeller outlet 10, respectively.

In some embodiments, the impeller shroud 5 can be comprised of an impeller eye 5E, having an outer stepped surface co-acting with a sealing arrangement mounted on the stationary casing of the turbomachine (not shown), wherein the impeller is arranged. The impeller disc 3 comprises a hub portion 3H surrounding a hole 11. In some embodiments a shaft extends through the holes of a plurality of axially aligned impellers and the rotor thus formed is mounted for rotation in the casing of the turbomachine. In other embodiments, the impeller can be provided with front and back teeth, such that adjacent impellers torsionally engage to one another. A tie rod extending through the holes of a stack of impellers locks the impellers together.

Each impeller blade 7 has a pressure side and a suction side defined by opposed surfaces of the impeller blade 7. The shape of the blade surfaces as well as the inner surface of impeller disc 3 and impeller shroud 5, which delimit each flow passage or vane 9, are dictated by fluid-dynamic considerations and can be rather complex.

According to some embodiments, the impeller 1 can be manufactured as described here below. A plurality of tubular components 13 can be manufactured in a first method step. FIGS. 4 through 7 illustrate various axonometric views of one such tubular component 13. The number of tubular components required for manufacturing an impeller 1 can correspond to the number of flow passages or vanes 9 provided in the impeller 1. The tubular components 13 can be identical to one another and only one tubular component 13 is therefore described herein referring to FIGS. 4 through 7.

According to embodiments disclosed herein, the tubular component 13 can comprise an inner flow passage 15 bounded by a substantial tubular wall 17. The tubular component 13 is comprised of an inlet 19 and an outlet 21. The shape of the inner surface of the flow passage 15 substantially corresponds to the shape of the flow passage or vane 9 of the final impeller 1.

In some embodiments, the inlet 19 can be arranged between two edges 23 and 25 formed by the wall 17 surrounding the flow passage 15. In some embodiments, one of the edges 23, 25 can be a sharp substantially rectilinear edge, while the other edge, in the example shown edge 25, can be formed by a portion of the wall 17, which is bent forming a sort of fold or lip 25L. The lip 25L can have a final edge 25I facing away from the inlet 19 and arranged at a distance from the side surface of the wall 17.

The method can further comprise a step of assembling tubular components 13 together in a number sufficient to form a circular arrangement of tubular components 13 in a number corresponding to the number of flow passages or vanes 9 of the final impeller 1.

FIGS. 8 and 9 illustrate axonometric views of three tubular components 13 assembled to one another. As can be appreciated from FIGS. 8 and 9, when the tubular components 13 are placed one adjacent to the other and connected to one another, the folded lip 25L of each tubular component 13 abut against the sharp edge 23 of the adjacent tubular component 13, so that an empty space or gap S, which is left between adjacent tubular components 13, can be substantially closed on the side facing the inlet 29 of the tubular component 13.

Figure 10:
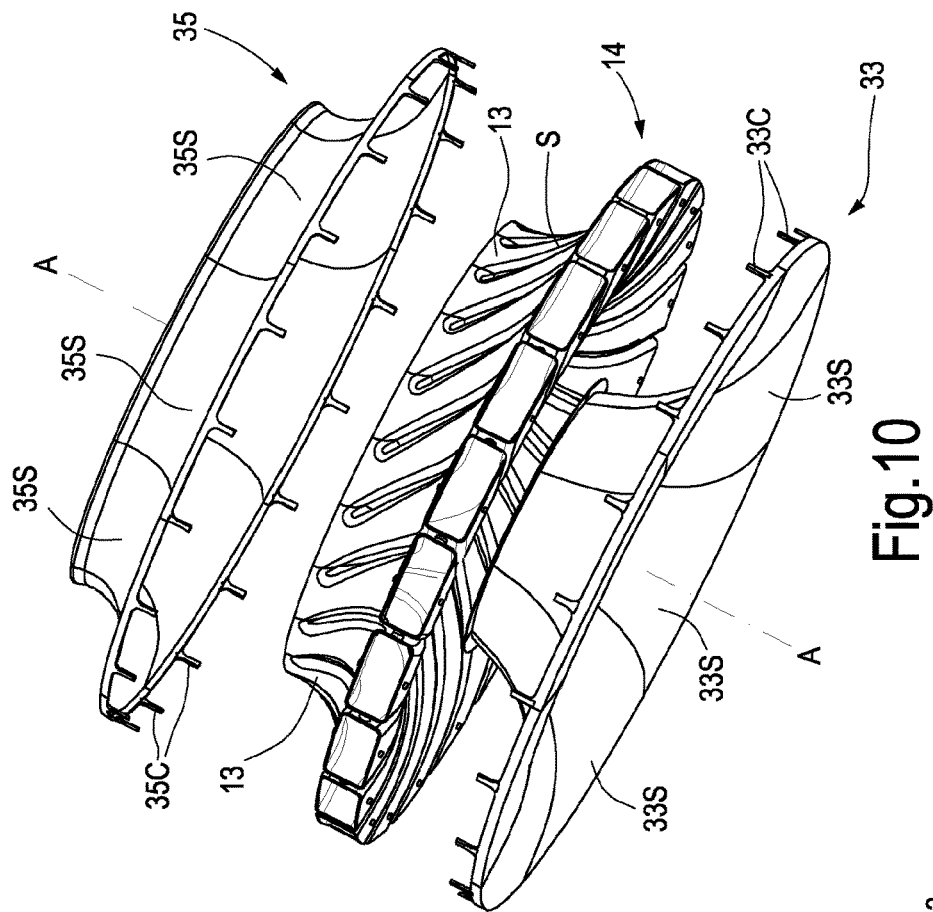
FIGS. 10 and 11 illustrate an exploded view of the mounted tubular components in combination with a disc skin and a shroud skin.
Figure 11:
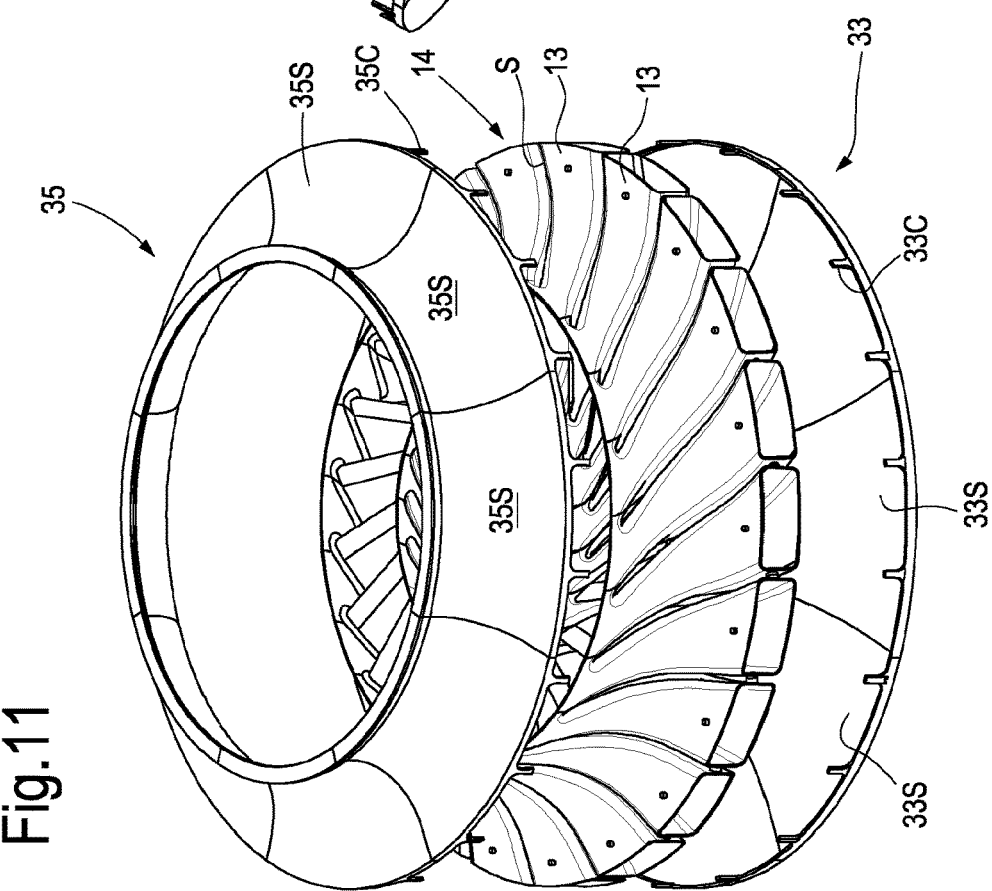

In FIGS. 10 and 11 a complete assembly 14 of circularly arranged tubular components 13 is shown. The assembly 14 surrounds an impeller axis A-A. The tubular components 13 are connected to one another for example by welding, brazing or the like. According to some embodiments, in order for the gap or empty space S to be left between adjacent tubular components 13, each tubular component 13 can be provided with a pair of pins 31 located near the respective outlet 21 and on opposite sides of the tubular component 13. Adjacent tubular components 13 contact each other at the opposing pins 31. The width of the empty space or gap S between consecutive tubular components 13 can correspond to twice the length of a pin 31.

Each tubular component 13 can be manufactured by any suitable manufacturing process. In some embodiments each tubular component 13 is manufactured by a hydroforming. According to embodiments of the method, a simple straight or curved pipe having for example a quadrangular cross-section can be subject to hydroforming in a suitably shaped mold, the shape whereof corresponds to the final shape of the tubular component 13. In some embodiments pins 31 can be welded or soldered to the outer surface of the tubular component 13 after hydroforming.

In other embodiments, each tubular component 13 can be formed by additive manufacturing. Additive manufacturing is known per se and will not be described herein in detail. Additive manufacturing is useful for manufacturing complex shapes, which might characterize for example three dimensional curvatures of the flow passages or vanes 9 in the impeller 1. Additive manufacturing using an electron beam gun as an energy source is suitable for the production of tubular components 13. Other energy sources, such as a laser source, can be used, depending upon the nature of the powder material used for manufacturing the tubular components 13.

According to some embodiments, the next step of the manufacturing process provides for manufacturing of a disc skin and a shroud skin, which are attached to the assembly 14 of tubular components 13, with the tubular components 13 arranged between the disc skin and the shroud skin. In FIGS. 10 and 11 reference number 33 designates the disc skin and reference number 35 designates the shroud skin.

In some embodiments the disc skin 33 can be formed by a monolithic component, for example a circular metal sheet. In some embodiments the disc skin 33 can be manufactured starting from a workpiece, such as a metal sheet, by a suitable permanent deformation process, such as light drawing, deep drawing, extra-deep drawing, molding, pressing, press-forging, hot-pressing, die-forming, or the like.

According to other embodiments, the disc skin 33 can be manufactured by additive manufacturing.

In other embodiments, the disc skin 33 can be manufactured starting from single skin segments 33S. A plurality of skin segments 33S can be connected to one another, for example by welding, brazing or in any other suitable manner. Each skin segment 33S can be manufactured starting from a workpiece, such as a metal sheet, by a suitable permanent deformation process, such as light drawing, deep drawing, extra-deep drawing, molding, pressing, press-forging, hot-pressing, die-forming, or the like.

According to some embodiments, each skin segment 33S can be manufactured by additive manufacturing.

In the embodiment shown in FIGS. 10 and 11 the number of skin segments 33S is smaller than the number of tubular components 13. The number of skin segments 33S forming the disc skin 33 can vary depending upon design considerations and based, for instance, on the kind of manufacturing process used for their production. The manufacturing process for the skin segments 33S can be chosen for instance based on the nature of the material used.

In some embodiments the shroud skin 35 can be formed by a monolithic component, for example a circular metal sheet. In some embodiments the shroud skin 35 can be manufactured starting from a workpiece, such as a metal sheet, by a suitable permanent deformation process, such as light drawing, deep drawing, extra-deep drawing, molding, pressing, press-forging, hot-pressing, die-forming, or the like.

According to other embodiments, the shroud skin 35 can be manufactured by additive manufacturing.

In other embodiments, the shroud skin 35 can be manufactured starting from single skin segments 35S. A plurality of skin segments 35S can be connected to one another, for example by welding, brazing or in any other suitable manner. Each skin segment 35S can be manufactured starting from a workpiece, such as a metal sheet, by a suitable permanent deformation process, such as light drawing, deep drawing, extra-deep drawing, molding, pressing, press-forging, hot-pressing, die-forming, or the like.

According to some embodiments, each skin segment 35S can be manufactured by additive manufacturing.

In the embodiment shown in FIGS. 10 and 11 the number of skin segments 35S of the shroud is smaller than the number of tubular components 13 and equal to the number of skin segments 33S forming the disk skin portion 33. This, however, is not essential. The number of skin portions 33S can be different from the number of skin portions 35S. Moreover, the number of skin segments 35S forming the shroud skin 35 can vary depending upon design considerations and based, for instance, on the kind of manufacturing process used for their production. The manufacturing process for the skin segments 35S can be chosen for instance based on the nature of the material used.

The same manufacturing process can be used for producing the shroud skin 35 and the disc skin 33. This, however, is not mandatory. In other embodiments, different techniques can be used for manufacturing the shroud skin 35 and the disc skin 33.

Figure 12:
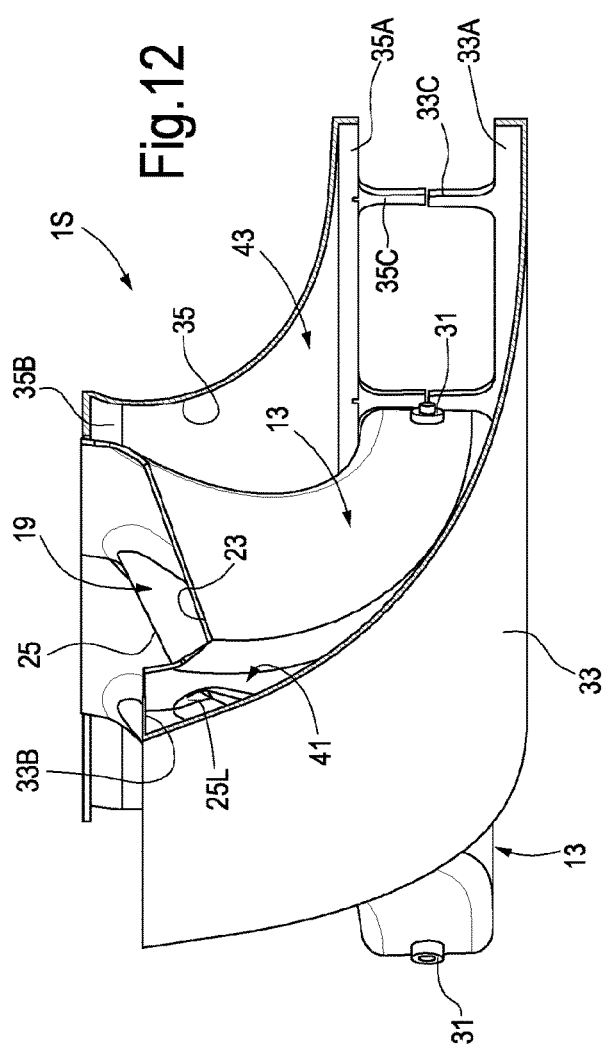
Figure 13:
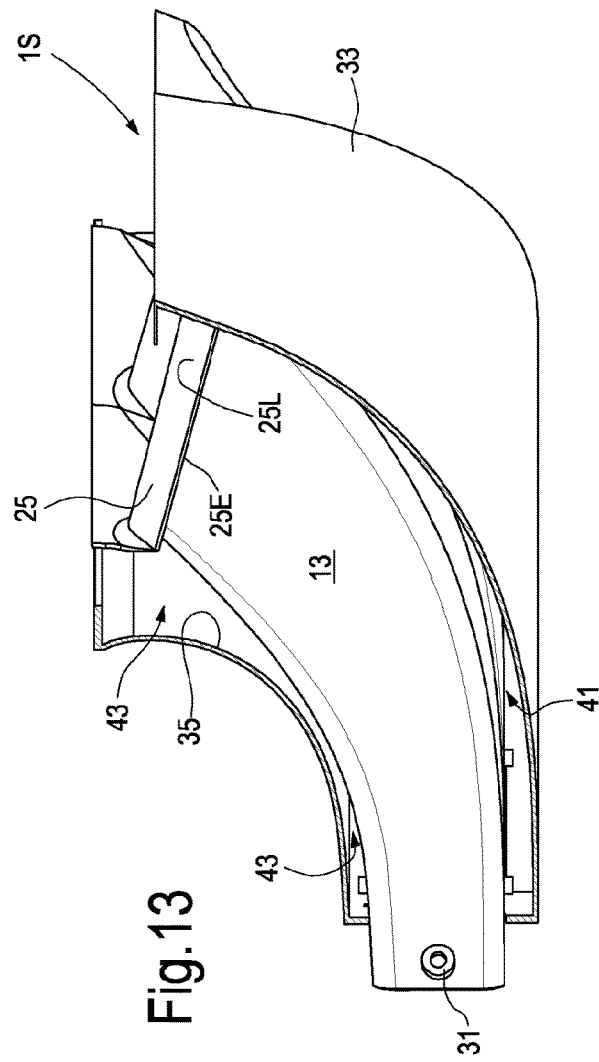

FIGS. 12 and 13 illustrate axonometric views of a portion of the semi-finished impeller 1, which is obtained by assembling the tubular components 13, the disc skin 33 and the shroud skin 35 to one another. In both FIGS. 12 and 13 a portion or segment 1S of the semi-finished impeller is shown. The impeller segment 15 comprises two tubular components 13 mounted and joined to one another.

As shown in FIG. 12, according to some embodiments, the disc skin 33 can be provided with circular edges 33A, 33B. According to some embodiments, the shroud skin 35 is also provided with circular edges 35A, 35B. The circular edges 33A and 35A can be arranged opposite to one another and the outlet 21 of the tubular components 13 are arranged along and between the two opposing circular edges 33A, 35A.

In some embodiments, appendages 33C project at regular intervals from the circular edge 33A towards the circular edge 35A. Similar appendages 35C can project from the circular edge 35A towards the circular 33A. Pairs of appendages 33C, 35C are arranged between adjacent tubular components 13 and frontally close the empty space or gap S therebetween.

The circular edges 33B and 35B extend around the circular arrangement of the inlets 19 of the tubular components 13 arranged in the circular assembly 14.

Two empty annular cavities 41 and 43 are formed between the disc skin 33 and the tubular components 13 and between the shroud skin 35 and the tubular components 13, respectively.

FIG. 14 illustrates an axonometric view of a portion 1P of the semi-finished impeller, with a segment thereof removed, to show the inner structure obtained by assembling the tubular components 13, the disc skin 33 and the shroud skin 35 to one another. The empty cavities 41 and 43 are shown.

In some embodiments, the next step of the method disclosed herein comprises filling the empty spaces or gaps S between consecutive tubular components 13 as well as empty cavities 41 and 43 with powder material, in particular metal powder material.

Prior to filling the gaps empty spaces S and the cavities 41, 43, the components 13, 33 and 35 can be welded, soldered or brazed to one another along mutually abutting edges, such that the inner volume of the semi-finished unit thus obtained is sealingly closed. In an embodiment, one, or two or more apertures are left for filling the gaps empty spaces S and the cavities 41, 43 and removing air or gas therefrom. After filling the cavities and gaps empty spaces with metal powder, the apertures can be sealed as well. In some embodiments, dead heads are left at the apertures, filled with metal powder and sealed e.g. by welding, soldering, brazing or the like. The metal powder filling the dead heads provides a powder reservoir which enters into the empty spaces gaps S and/or into cavities 41, 43 during the subsequent hot isostatic pressing, in order to compensate for a reduction of the total powder volume, such that no deformation of the outer surface of the semi-finished impeller occurs during hot isostatic pressing.

Before hot isostatic pressing or before filling the cavities 41, 43 and gaps or empty spaces S, the weld beads can be checked. The weld beads can be cleaned, finished, lapped or treated in any suitable way to remove surface irregularities on the weld beads.

Once the annular cavities 41, 43 and spaces or gaps S have been filled with metal powder and the apertures have been sealed, the semi-finished impeller 1 is subject to hot isostatic pressing, or so called hipping. This process causes the powder material filling the gaps or empty spaces and cavities inside the semi-finished impeller to densify and coalesce, until a solid structure is obtained.

Suitable temperatures in the range of about 480° C.-1500° C. and suitable pressure in the range of about 50 Mpa-310 Mpa can be used for this hipping step. These values are provided by way of example only and shall not be construed as limiting the present disclosure.

Figure 19:
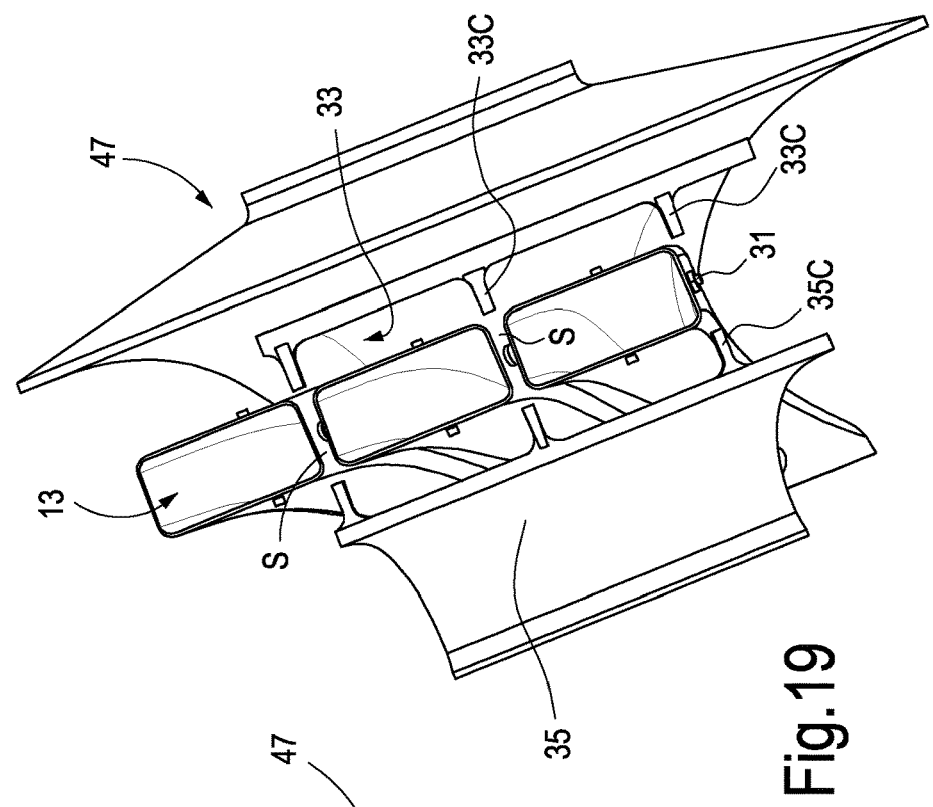
FIGS. 18 and 19 illustrate axonometric and partly sectioned views of the impeller during manufacturing thereof, in combination with a hub portion.
Figure 18:
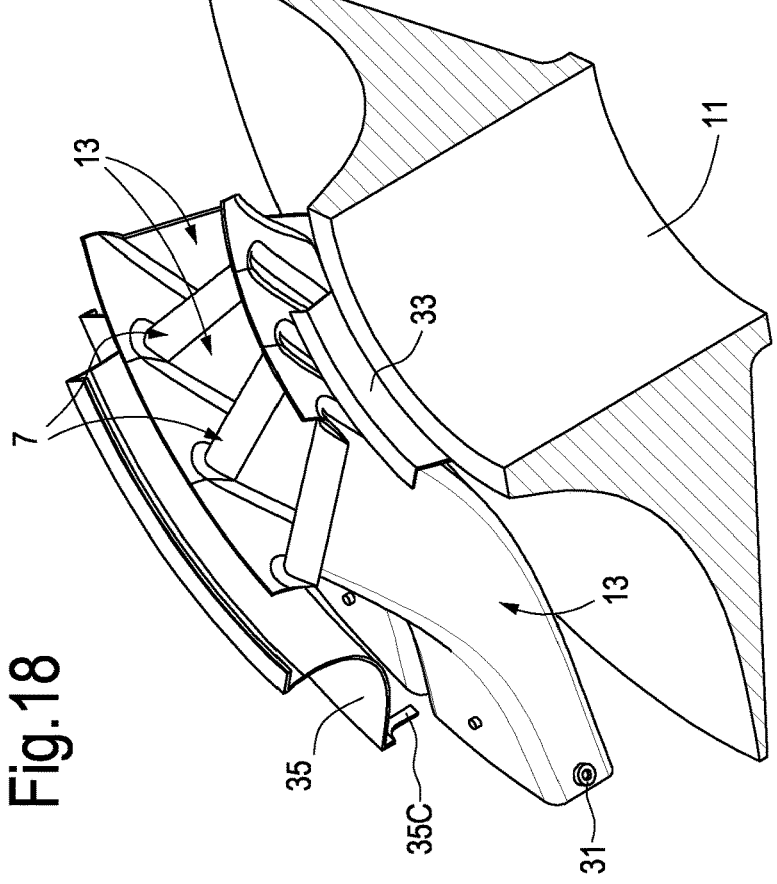

Along with the hipping phase or afterwards a hub portion 47 can be connected to the impeller disc. FIGS. 18 and 19 illustrate axonometric views of a hub portion 47, which can be applied on the outer surface of the disc skin 35 prior to hipping. Bonding of the hub portion 47 can be obtained by diffusion bonding during the same hipping process or in a separate step after hipping of the shroud skin 35, disc skin 33 and tubular components 13.

As best shown in FIG. 19 the hub portion 47 forms a through hole 11 of the final impeller 1. In FIGS. 18 and 19 the hub portion 47 and the remaining components 35, 33, 13 of the impeller are shown in an exploded and partial view, with portions removed for the sake of better understanding of the overall structure.

As a result of the above described method, each blade 7 of the impeller 1 is formed by side-walls of two consecutive tubular components 13 and by the metal powder with which the empty space or gap S therebetween has been filled prior to hipping. The leading edge 7L of each blade 7 is formed by the folded edge 25 and relevant lip 25L, while the trailing edge is formed by the appendages 33C and 35C. The inner volume of each tubular component 13 thus forms a respective impeller vane, i.e. a flow passage for the fluid processed by the impeller.

The disc 3 of the impeller 1 and relevant hub portion 3H thereof are formed by the hub portion 47, the disc skin 33 and by the powder material filling the empty cavity or gap 41 and which is densified and solidified by hipping.

The shroud 5 of the impeller 1 is in turn formed by the shroud skin 33 and by the powder material used to fill the empty cavity 43.

FIG. 15 illustrates an axonometric view of the final impeller 1, which may be subject to additional final machining operations, for example to remove asperities, steps and the like such as for example along the folded lips 25L of each edge 25 of tubular components 13.

In some embodiments, the disc skin 33 and the shroud skin 35 can be manufactured from a monolithic workpiece, for example from a metal sheet which is plastically deformed by drawing or the like. FIGS. 16 and 17 illustrate axonometric views similar to the views of FIGS. 10 and 11, wherein the shroud skin 35 and the disc skin 33 are formed by single pieces of metal, for example metal sheets.

FIGS. 20 to 24 illustrate a further embodiment of the manufacturing methods disclosed herein. According to this alternative embodiment, the impeller 1 is manufactured by assembling a plurality of segments, each segment including a tubular component corresponding to a respective one of the various flow passages or vanes of the impeller, as well as a shroud segment and a disc segment. The impeller segments are mounted one adjacent the other to form a semi-finished impeller comprising a plurality of empty cavities therein, which are subsequently filled with powder material, such as metal powder, for subsequent densification by hipping.

Figure 20:
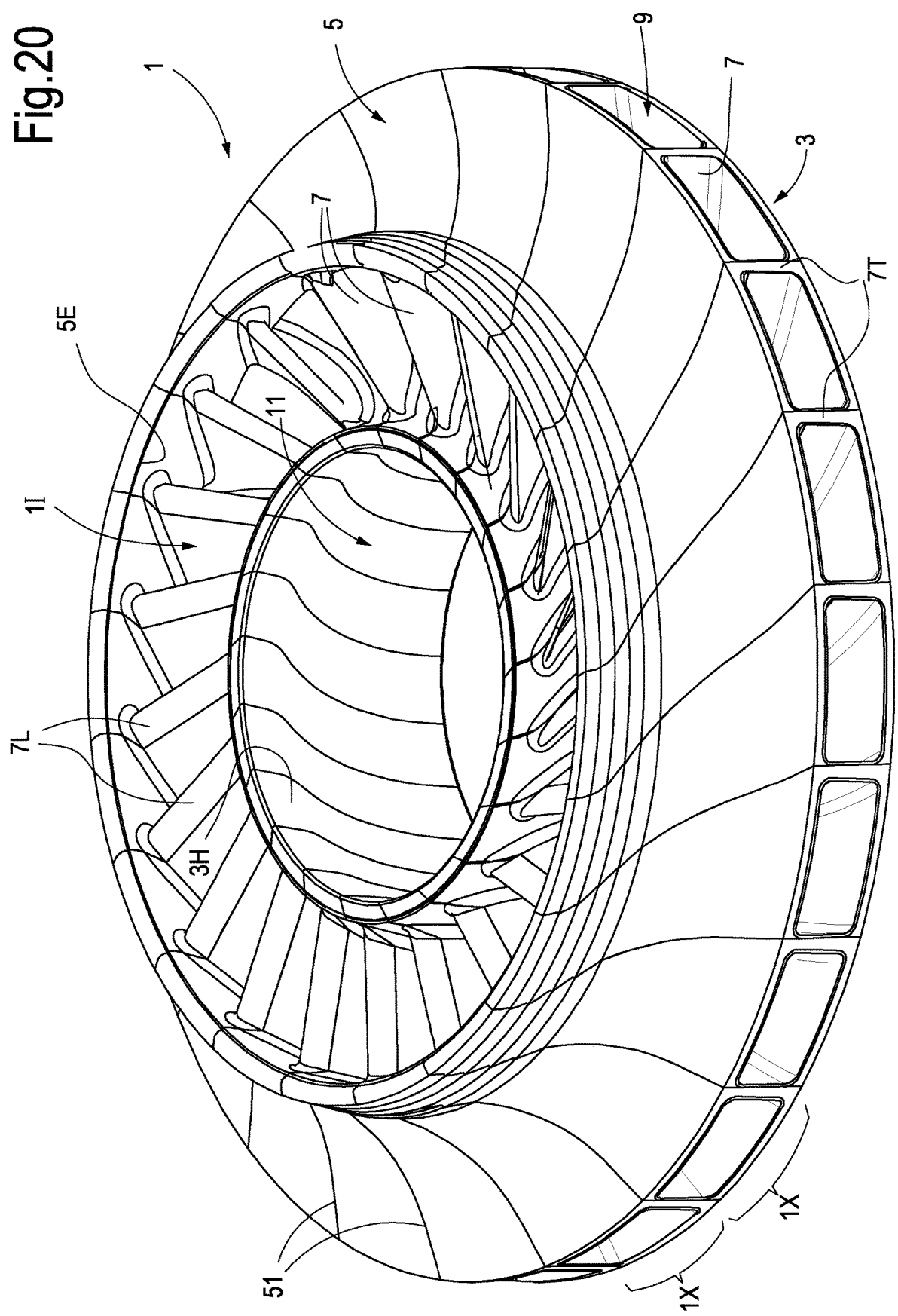
FIG. 20 illustrates an axonometric view of an impeller according to a further embodiment of the methods disclosed herein.

More specifically, FIG. 20 illustrates an axonometric view of an impeller 1 comprised of an impeller disc 3 and an impeller shroud 5 with impeller blades 7 therebetween. Flow passages or vanes 9 are formed between adjacent blades 7. An impeller eye 5E is formed by the impeller shroud 5 around an impeller inlet 11. 7L and 7T designate the leading edges and trailing edges of blades 7, respectively.

As represented by lines 51, the impeller 1 is formed by a plurality of impeller segments 1X, which are arranged one adjacent to the other in a circular arrangement around a central hole 11 formed by a hub portion 3H of the impeller 1.

FIGS. 21, 22 and 23 illustrate in different axonometric views a single impeller segment 1X. Each impeller segment 1X can be manufactured by means of any suitable process. According to some embodiments each impeller segment 1X is formed by additive manufacturing, using for instance an electron beam gun as a source of energy.

According to some embodiments, each impeller segment 1X comprises a tubular component 13, which is integrally formed with a shroud segment 5X and a disc segment 3X. The interior of the tubular component 13 can be designed quite in the same way as the interior of the tubular component 13 of the previously described embodiment. The tubular component 13 has an inlet 19 and an outlet 21. Reference numbers 23 and 25 designate respective edges arranged at the inlet 19. A passage 15 is formed inside the tubular component 13. The passage 15 has a shape substantially corresponding to the shape of a flow passage or vane 9 of the impeller 1.

Between the shroud segment 5X and the outer wall of the tubular component 13 an empty cavity 43X is provided. Between the disc segment 3X and the outer surface of the tubular component 13 a respective empty cavity 41X is provided.

According to some embodiments, the method comprises a subsequent step wherein a plurality of tubular components 13, each provided with the respective shroud segment 5X and disc segment 3X, are assembled together quite in the same way as previously described in connection with the embodiment disclosed in FIGS. 1 through 19.

FIGS. 24 and 25 illustrate a group of three tubular components 13 in the assembled condition. The tubular components 13 can be soldered, welded, brazed or connected to one another with any other suitable technique. When assembling the tubular components 13 to one another, an empty annular cavity 41 extending around the axis X-X of the impeller is formed by the plurality of adjoining empty cavities 41X provided in each tubular component 13 between the disc segment 3X and the outer wall of the tubular component 13. Similarly an empty annular cavity 43 is formed by the single cavities 43X of the tubular components 13 assembled together.

A gap or empty space S is also left between the outer side surface of each pair of adjacent tubular components 13. The gaps or empty spaces S and the empty cavities 41 and 43 are subsequently filled with powder material, for example metal powder material. Filling can be obtained through suitably arranged apertures in the outer skin of the impeller shroud or of the impeller disc formed by the shroud segments 5X and by the disc segments 3X of the assembled tubular components 13.

Once the empty annular cavities 41, 43 and empty spaces or gaps S have been filled with powder material, the apertures used for filling can be sealed. Prior to filling the gaps or empty spaces S with powder material, the abutting edges of the components forming the semi-finished impeller can be sealed by welding, brazing, soldering or the like, such that sealingly closed cavities are provided in the semi-finished impeller.

The semi-finished impeller thus obtained is subject to hipping, so that the metal powder material introduced in the cavities and empty spaces or gaps S is densified and transformed into a solid metal mass.

Final machining and finishing can be required, e.g. to remove asperities on the surfaces of the impeller 1.

In the manufacturing method according to the embodiments disclosed herein, each blade is formed by two skin portions and an inner core. The two skin portions form a suction side and a pressure side of the respective blade. The inner core is formed by powder material densified by hipping and the suction side and pressure side of the blade are formed by side walls of the two mutually adjacent tubular components 13, forming the blade skins.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. Different features, structures and and instrumentalities of the various embodiments can be differently combined.

What is claimed is:

1. A method for producing an impeller comprising a disc, a shroud, a plurality of blades between the disc and the shroud and flow passages between adjacent blades, the method comprising the following steps:
    manufacturing a plurality of tubular components, each tubular component forming a respective flow passage of the impeller and having an inlet and an outlet;
    assembling the tubular components to one another forming a plurality of circularly arranged tubular components around an impeller axis, leaving empty gaps between adjacent tubular components;
    filling the empty gaps with a powder material; and
    densifying the powder material in the empty gaps by hot isostatic pressing.

2. The method of claim 1, wherein the step of manufacturing the tubular components comprises manufacturing the tubular components by additive manufacturing or hydroforming.

3. The method of claim 1, further comprising the steps of forming a shroud skin and a disc skin, the circularly arranged tubular components being located between the shroud skin and the disc skin and connected thereto.

4. The method of claim 3, further comprising the steps of:
    leaving a first empty cavity between the shroud skin and the tubular components;
    filling the first empty cavity with a powder material; and
    densifying the powder material in the first cavity by hot isostatic pressing.

5. The method of claim 3, further comprising the steps of:
    leaving a second empty cavity between the disc skin and the tubular components;
    filling the second empty cavity with a powder material; and
    densifying the powder material in the second cavity by hot isostatic pressing.

6. The method of claim 3, further comprising the step of bonding an impeller hub to the disc skin.

7. The method of claim 6, wherein the impeller hub and the disc skin are connected to one another by one of diffusion bonding and welding.

8. The method of claim 4, wherein at least one of the shroud skin and the disc skin is formed from a monolithic workpiece.

9. The method of claim 3, wherein the step of forming the shroud skin comprises the steps of manufacturing a plurality of shroud skin segments and connecting the shroud skin segments to one another.

10. The method of claim 9, wherein the shroud skin segments are manufactured by additive manufacturing.

11. The method of claim 3, wherein the step of forming the disc skin comprises the step of manufacturing a plurality of disc skin segments and connecting the disc skin segments to one another.

12. The method of claim 11, wherein the disc skin segments are manufactured by additive manufacturing.

13. The method of claim 1, wherein the step of manufacturing each tubular component comprises the step of simultaneously forming at least one of a shroud segment and a disc segment as a single piece with the respective tubular component.

14. The method of claim 13, wherein:
- an empty cavity is formed between each tubular component and the at least one of the shroud segment and the disc segment;
- at least one empty annular cavity is formed by assembling the tubular components to one another, the at least one empty annular cavity arranged between the tubular components and a shroud skin formed by the shroud segments or between the tubular components and a disc skin formed by the disc segments;
- the empty annular cavity is filled with a powder material; and
- the powder material in the annular cavity is densified by hot isostatic pressing.

15. The method of claim 13, wherein each disc segment comprises a hub segment.

16. The method of claim 15, wherein the hub segment comprises an empty volume surrounded by a skin.

17. The method of claim 16, wherein:
- an empty annular cavity is formed in a hub portion of the impeller by assembling the tubular components and the respective disc segments to one another;
- the empty annular cavity is filled with a powder material; and
- the powder material in the annular cavity is densified by hot isostatic pressing.

18. A method for producing an impeller comprising a disc, a shroud, a plurality of blades between the disc and the shroud, and flow passages formed between adjacent blades, the method comprises the following steps:
- manufacturing a plurality of impeller segments, each impeller segment comprised of a tubular component having an inlet and an outlet and forming a respective flow passage between blades of the impeller, a shroud segment and a disc segment;
- assembling and joining the impeller segments to one another, leaving empty gaps between tubular components of adjacent impeller segments;
- filling the empty gaps with a powder material; and
- densifying the powder material in the spaces by hot isostatic pressing.

19. The method of claim 18, wherein each impeller segment comprises an empty volume in the respective disc segment, the empty volumes of the disc segments forming an empty annular cavity once the impeller segments are assembled and joined to one another; and wherein the empty annular cavity is filled with a powder material, which is densified by hot isostatic pressing.

20. The method of claim 18, wherein each impeller segment comprises an empty volume in the respective shroud segment, the empty volumes of the shroud segments forming an empty annular cavity once the impeller segments are assembled and joined to one another; and wherein the empty annular cavity is filled with a powder material, which is densified by hot isostatic pressing.

21. The method of claim 13, further comprising the step of forming at least one of a shroud and a disc by assembling the tubular components to one another.

* * * * *